Patented Sept. 5, 1944

2,357,364

UNITED STATES PATENT OFFICE 2,357,364

KETO DERIVATIVES OF 17-ETHYNYL-17-HYDROXY-PERHYDROCYCLOPENTENO-PHENANTHRENES AND PROCESS OF PREPARING THEM

Homer E. Stavely, Highland Park, N. J., assignor to E. R. Squibb & Sons, New York, N. Y., a corporation of New York No Drawing. Application March 22, 1940,
Serial No. 325,472

9 Claims. (Cl. 260—586)

This invention relates to, and has for its object the provision of, keto derivatives of 17-ethynyl-17 - hydroxy - perhydro - cyclopentenophenanthrenes—especially keto derivatives of 17-ethynyl-17-hydroxy-substituted compounds of the androstane series—and a process for preparing them. These derivatives, notably that derived from $\Delta^5$-17-ethynyl-androstenediol-3,17 are important as precursors of compounds having therapeutically-utilizable physiological properties.

In the following description and claims, the nomenclature and numbering system employed is that established by the American Chemical Society monograph "Chemistry of Natural Products Related to Phenanthrene" by L. F. Fieser, published in 1936 by Reinhold Publishing Corporation, New York city. Thus, by "compounds of the androstane series" is meant compounds which have the hydrocarbon nucleus of androstane and which may also embody oxy- and/or oxo-substituents.

The keto derivatives of this invention may be obtained by heating with water a 17-ethynyl-17-hydroxy-perhydrocyclopentenophenanthrene, e. g. $\Delta^5$-17-ethynyl-androstendiol-3,17 or 17-ethynyl-estradiol—preferably to a temperature of about 105–130° C., in a sealed reactor, and in the presence of a hydration catalyst, such as a water-soluble mercuric salt. The 17-ethynyl-17-hydroxy - perhydrocyclopentenophenanthrenes may conveniently be obtained from perhydrocyclopentenophenanthrenes having a nuclear keto group (e. g. dehydroisoandrosterone) by reaction with acetylene in the presence of a tertiary alcoholate, as described in Stavely application Serial No. 228,957, filed September 8, 1938 (now Patent No. 2,239,864, dated April 29, 1941).

It is believed that, in the formation of the keto derivatives of this invention, the 17-ethynyl-17-hydroxy - perhydrocyclopentenophenanthrene is first hydrated to the corresponding 17-acetyl-17-hydroxy - perhydrocyclopentenophenanthrene, and that the cyclopenteno residue of the latter rearranges during the treatment into a six-membered ring having nuclear keto, hydroxy, and methyl groups. Thus, it is believed that $\Delta^5$-17-ethynyl-androstendiol-3,17,

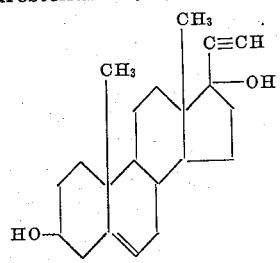

for example, is first hydrated to form $\Delta^5$-pregnendiol-3,17-one-20,

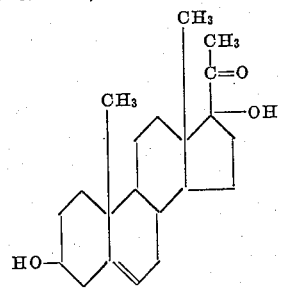

and that the latter rearranges during the treatment into an isomeric compound having a six-membered ring in place of the cyclo-penteno residue, and nuclear keto, hydroxy, and methyl groups in said ring. The name "chrysopregnane" is proposed for the parent hydrocarbon of the keto derivatives of this invention to express the relation to chrysene as well as to pregnane. The provision of compound I is part of the subject-matter of my application Serial No. 325,473, filed simultaneously herewith.

The following example is illustrative of the invention: 800 mg. of $\Delta^5$-17-ethynyl-androstenediol-3,17, 1.0 g. of C. P. mercuric sulfate, and 20 cc. distilled water are sealed in a glass tube, and maintained at a temperature of 110–120° C. for 24 hours. The contents of the tube is extracted with ether, and the extract is washed with a dilute solution of sodium carbonate and then with water; the ether is evaporated, and the residue recrystallized from acetone. The product is obtained as hexagonal prisms melting at 278–280° C. A further quantity of the product is obtained from the aqueous layer formed during the ether extraction, by alkalinizing it with NaOH, saturating with $H_2S$, extracting with ether, and treating the ether extract as described hereinabove. The total yield is 35% of the theoretical.

This application is a continuation-in-part of my application Serial No. 246,861, filed December 20, 1938.

The invention may be variously otherwise embodied within the scope of the appended claims.

I claim:

1. The process which comprises heating a 17-ethynyl-17-hydroxy-perhydrocyclopentenophenanthrene with water in the presence of a hydration catalyst.

2. The process which comprises heating a 17-ethynyl-17-hydroxy-perhydrocyclopentenophenanthrene with water in the presence of a water-soluble mercuric salt.

3. The process which comprises heating a 17-ethynyl-17-hydroxy-perhydrocyclopentenophenanthrene with water in the presence of a hydration catalyst at about 105–130° C. in a sealed reactor.

4. The process which comprises heating a 17-ethynyl-17-hydroxy-substituted compound of the androstane series with water in the presence of a hydration catalyst.

5. The process which comprises heating $\Delta^5$-17-ethynyl-androstenediol-3,17 with water in the presence of a hydration catalyst.

6. The process which comprises heating $\Delta^5$-17-ethynyl-androstene-diol-3,17 with water in the presence of mercuric sulfate at about 110°–120° C. in a sealed reactor.

7. The product obtained by heating a 17-ethynyl-17-hydroxy-perhydrocyclopentenophenanthrene with water in the presence of a hydration catalyst.

8. The product obtained by heating a 17-ethynyl-17-hydroxy-substituted compound of the androstane series with water in the presence of a hydration catalyst.

9. The product obtained by heating $\Delta^5$-17-ethynyl-androstenediol-3,17 with water in the presence of a hydration catalyst.

HOMER E. STAVELY.